US011815930B1

(12) United States Patent
Nolan et al.

(10) Patent No.: US 11,815,930 B1
(45) Date of Patent: Nov. 14, 2023

(54) SYSTEM FOR ACTUATING VEHICLE BRAKE AND ACCELERATOR PEDALS BY HAND

(71) Applicant: GM GLOBAL TECHNOLOGY OPERATIONS LLC, Detroit, MI (US)

(72) Inventors: Kyle Patrick Nolan, Sterling Heights, MI (US); Victor Wong, Lake Orion, MI (US); Cameron Tyler Knight, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/124,831

(22) Filed: Mar. 22, 2023

(51) Int. Cl.
*B60K 26/02* (2006.01)
*G05G 9/02* (2006.01)
*B60T 7/10* (2006.01)

(52) U.S. Cl.
CPC .............. *G05G 9/02* (2013.01); *B60K 26/02* (2013.01); *B60T 7/102* (2013.01)

(58) Field of Classification Search
CPC ... G05G 9/02; G05G 1/54; G05G 1/04; B60K 26/02; B60K 2026/027; B60K 2026/029; B60T 7/08; B60T 7/10; B60T 7/102; B60T 17/223
See application file for complete search history.

(56) References Cited

U.S. PATENT DOCUMENTS

| | | | | | |
|---|---|---|---|---|---|
| 2,777,335 | A | * | 1/1957 | Engberg ................ | B60W 30/18 74/486 |
| 3,373,628 | A | * | 3/1968 | Lake ..................... | B60W 30/18 74/484 R |
| 4,969,541 | A | * | 11/1990 | Lin ........................ | B60T 17/223 188/162 |
| 5,022,283 | A | * | 6/1991 | Deslandes ............. | B60W 30/18 74/543 |
| 5,025,905 | A | * | 6/1991 | Lenz ..................... | B60W 30/18 74/522 |

(Continued)

FOREIGN PATENT DOCUMENTS

| | | | |
|---|---|---|---|
| DE | 19715992 | A1 * | 1/1998 |
| DE | 10140187 | A1 * | 3/2003 |

(Continued)

OTHER PUBLICATIONS

Translation of KR-20220131040-A.*

(Continued)

*Primary Examiner* — Richard W Ridley
*Assistant Examiner* — Brian J McGovern

(57) ABSTRACT

A system for actuating a brake pedal and an accelerator pedal of a vehicle by hand. The system includes a planetary gear train having a sun gear, a ring gear, and planetary gears meshed with both the sun gear and the ring gear. The planetary gears are mounted to a carrier. A carrier flange is in cooperation with the carrier to rotate with the carrier. A sun gear flange is in cooperation with the sun gear. Rotation of the sun gear flange rotates the sun gear. A lever is mounted adjacent to the sun gear flange. An accelerator actuation assembly is connected to the lever and configured to couple with the accelerator pedal. A brake actuation assembly is connected to the carrier flange and configured to couple with the brake pedal.

20 Claims, 6 Drawing Sheets

(56) References Cited

U.S. PATENT DOCUMENTS

| | | | | |
|---|---|---|---|---|
| 5,121,651 | A * | 6/1992 | Bristow | B60W 30/18 |
| | | | | 403/77 |
| 5,129,492 | A * | 7/1992 | Lenz | B60W 30/18 |
| | | | | 477/27 |
| 6,435,055 | B1 * | 8/2002 | Sato | G05G 9/02 |
| | | | | 74/562.5 |
| 10,175,713 | B1 * | 1/2019 | Howell | B60T 7/06 |
| 2010/0326759 | A1 * | 12/2010 | Feng | B60K 26/02 |
| | | | | 180/333 |
| 2011/0154941 | A1 * | 6/2011 | Gibbs | F16C 1/12 |
| | | | | 74/503 |
| 2016/0052390 | A1 * | 2/2016 | Park | A61F 4/00 |
| | | | | 74/473.31 |
| 2020/0324650 | A1 * | 10/2020 | Erwin | G07C 5/085 |
| 2021/0046916 | A1 * | 2/2021 | Patterson | B60T 11/18 |
| 2021/0221338 | A1 * | 7/2021 | Anderson | F16H 21/16 |
| 2021/0339720 | A1 * | 11/2021 | McGinnis | B60T 17/20 |

FOREIGN PATENT DOCUMENTS

| | | | | |
|---|---|---|---|---|
| FR | 2407093 | A1 * | 5/1979 | |
| GB | 2571373 | A  * | 8/2019 | |
| JP | 6150264 | B1 * | 6/2017 | |
| KR | 20220131040 | A  * | 9/2022 | |
| KR | 20220142332 | A  * | 10/2022 | |

OTHER PUBLICATIONS

Translation of KR-20220142332-A.*
Translation of JP-6150264-B1.*
Translation of FR-2407093-A1.*
Translation of DE-19715992-A1.*
Translation of DE-10140187-A1.*

* cited by examiner

SYSTEM FOR ACTUATING VEHICLE BRAKE AND ACCELERATOR PEDALS BY HAND

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a system for actuating vehicle brake and accelerator pedals by hand.

Persons with certain disabilities may find it difficult to operate vehicle brake and accelerator foot pedals. Various control systems allow such persons to operate foot pedals by hand.

SUMMARY

In various features, the present disclosure includes a system for actuating a brake pedal and an accelerator pedal of a vehicle by hand. The system includes a planetary gear train having a sun gear, a ring gear, and planetary gears meshed with both the sun gear and the ring gear, the planetary gears are mounted to a carrier. A carrier flange is in cooperation with the carrier to rotate with the carrier. A sun gear flange is in cooperation with the sun gear. Rotation of the sun gear flange rotates the sun gear. A lever is mounted adjacent to the sun gear flange. An accelerator actuation assembly is connected to the lever and configured to couple with the accelerator pedal. A brake actuation assembly is connected to the carrier flange and configured to couple with the brake pedal. Actuation of the lever in an acceleration direction pushes the accelerator actuation assembly against the accelerator pedal to depress the accelerator pedal. Actuation of the lever in a brake direction moves the lever into contact with the sun gear flange to rotate the sun gear flange and the sun gear, which rotates the carrier flange towards the brake pedal to push the brake actuation assembly against the brake pedal and depress the brake pedal.

In further features, the lever is seated on a base of the sun gear flange and rotates independently of the sun gear flange.

In further features, a handle is connected to the lever, the handle is configured to be grasped by a driver.

In further features, the handle is pivotably movable relative to the lever to change a handle angle of the handle relative to the lever.

In further features, the accelerator actuation assembly is connected directly to the lever.

In further features, the accelerator actuation assembly is connected to a distal end of the lever that is opposite to a proximal end of the lever to which a handle is connected to.

In further features, a base includes a first side to which the planetary gear train is mounted and a second side on which the sun gear flange and the lever are arranged.

In further features, the base is connected to an adaptor plate configured to be mounted to the vehicle beneath a seat rail.

In further features, the accelerator actuation assembly includes an accelerator plate at a distal end of the accelerator actuation assembly. The accelerator plate includes a strap and a receptacle. The strap is configured to be wrapped around the accelerator pedal and locked in the receptacle to couple the accelerator actuation assembly to the accelerator pedal.

In further features, the brake actuation assembly includes a brake plate at a distal end of the brake actuation assembly. A strap and a receptacle are mounted to the brake plate. The strap is configured to be wrapped around the brake pedal and locked in the receptacle to couple the brake plate to the brake pedal. A flange is mounted to the brake plate. The flange is adjustable to abut an outer edge of the brake pedal to restrict lateral movement of the brake plate relative to the brake pedal.

In various features, the present disclosure includes a system for actuating a brake pedal and an accelerator pedal of a vehicle by hand. The system includes a base including a bracket configured to be mounted to a seat rail of the vehicle. A planetary gear train is mounted to a first side of the base. The planetary gear train includes a sun gear, a ring gear, and planetary gears meshed with both the sun gear and the ring gear. The planetary gears are mounted to a carrier. A carrier flange is in cooperation with the carrier such that rotation of the carrier rotates the carrier flange. A sun gear flange is on a second side of the base that is opposite to the first side. The sun gear flange is in cooperation with the sun gear such that rotation of the sun gear flange rotates the sun gear. A lever is mounted on a base of the sun gear flange and rotatable independent of the sun gear flange. An accelerator actuation assembly is connected directly to the lever and configured to couple with the accelerator pedal. A brake actuation assembly is connected to the carrier flange and configured to couple with the brake pedal. Actuation of the lever in an acceleration direction pushes the accelerator actuation assembly against the accelerator pedal to depress the accelerator pedal. Actuation of the lever in a brake direction moves the lever into contact with the sun gear flange to rotate the sun gear flange and the sun gear, which rotates the carrier flange towards the brake pedal to push the brake actuation assembly against the brake pedal and depress the brake pedal.

In further features, each one of the carrier flange, the sun gear flange, the sun gear, and the lever rotate about a common axis of rotation.

In further features, the bracket is configured to be mounted to a seat rail of the vehicle by way of an adaptor plate.

In further features, the accelerator actuation assembly includes an accelerator plate at a distal end of the accelerator actuation assembly. The accelerator plate includes a strap and a receptacle. The strap is configured to be wrapped around the accelerator pedal and locked in the receptacle to couple the accelerator actuation assembly to the accelerator pedal.

In further features, the brake actuation assembly includes a brake plate at a distal end of the brake actuation assembly. A strap and a receptacle are mounted to the brake plate. The strap is configured to be wrapped around the brake pedal and locked in the receptacle to couple the brake actuation assembly to the brake pedal. A flange is mounted to the brake plate. The flange is adjustable to abut an outer edge of the brake pedal to restrict lateral movement of the brake plate relative to the brake pedal.

In further features, a handle is connected to the lever. The handle is configured to be grasped by a driver.

In further features, the handle is pivotably movable relative to the lever to change a handle angle of the handle relative to the lever.

The present disclosure further includes, in various features, a system for actuating a brake pedal and an accelerator pedal of a vehicle by hand. The system includes a planetary gear train including a sun gear, a ring gear, and planetary gears meshed with both the sun gear and the ring gear. The planetary gears are mounted to a carrier. A carrier flange is in cooperation with the carrier to rotate with the carrier. A sun gear flange is in cooperation with the sun gear. Rotation of the sun gear flange rotates the sun gear. A lever is mounted on a base of the sun gear flange, the lever rotatable independent of the sun gear. An accelerator actuation assembly is coupled to the lever and includes an accelerator plate, a strap, and a coupling member configured to couple with the strap. The strap is configured to be wrapped around the accelerator pedal and locked to the coupling member to secure the accelerator actuation assembly to the accelerator pedal. A brake actuation assembly is connected to the carrier flange and includes a brake plate and a brake strap. The brake strap is configured to be wrapped around the brake pedal to couple the brake actuation assembly to the brake pedal. Each one of the carrier flange, the sun gear flange, the sun gear, and the lever rotate about a common axis. Rotation of the lever in an acceleration direction pushes the accelerator actuation assembly against the accelerator pedal to depress the accelerator pedal. Rotation of the lever in a brake direction, which is opposite to the acceleration direction, moves the lever into contact with the sun gear flange to rotate the sun gear flange and rotate the carrier flange towards the brake pedal to push the brake actuation assembly against the brake pedal and depress the brake pedal. Each one of the carrier flange, the sun gear flange, the sun gear, and the lever rotate about a common axis. Rotation of the lever in an acceleration direction pushes the accelerator actuation assembly against the accelerator pedal to depress the accelerator pedal. Rotation of the lever in a brake direction, which is opposite to the acceleration direction, moves the lever into contact with the sun gear flange to rotate the sun gear flange and rotate the carrier flange towards the brake pedal to push the brake actuation assembly against the brake pedal and depress the brake pedal.

In further features, the brake actuation assembly further includes a flange mounted to the brake plate, the flange is adjustable to abut an outer edge of the brake pedal to restrict lateral movement of the brake plate relative to the brake pedal.

In further features, a base including a first side to which the planetary gear train is mounted and a second side on which the sun gear flange and the lever are arranged.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
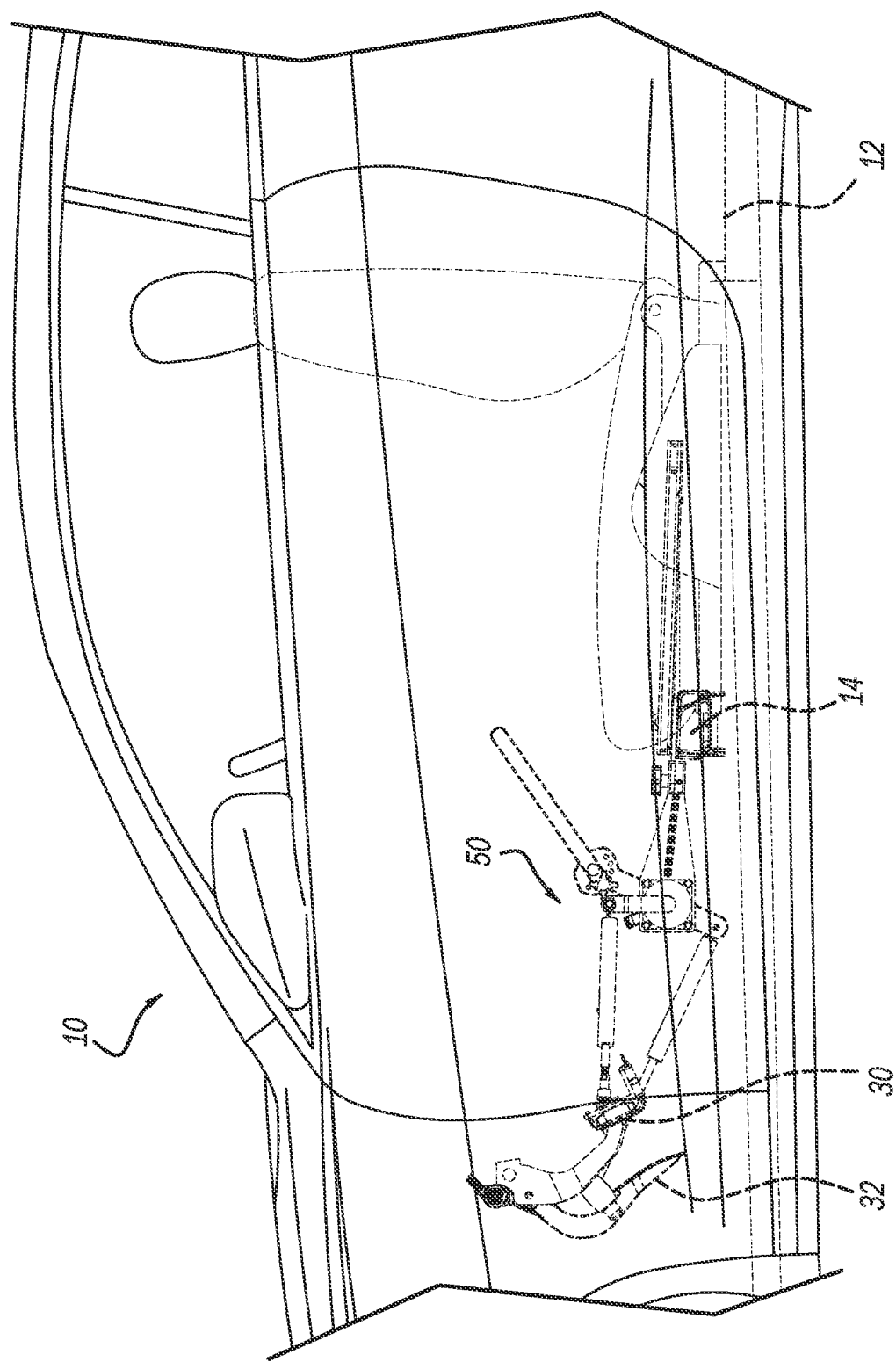
FIG. 1 illustrates an exemplary vehicle including a system in accordance with the present disclosure for actuating vehicle brake and accelerator foot pedals by hand.

FIG. 1 illustrates an exemplary vehicle 10 including a system 50 in accordance with the present disclosure for actuating brake and accelerator foot pedals of the vehicle 10 by hand. The vehicle 10 may be any suitable vehicle, such as any suitable passenger vehicle, utility vehicle, recreational vehicle, mass transit vehicle, construction vehicle, military vehicle, aircraft, etc. The system 50 may be configured for use in any suitable non-vehicular application as well. The system 50 is configured to allow drivers who are disabled or otherwise unable to actuate accelerator or brake foot pedals using his or her feet, to actuate the pedals by hand.

Figure 2:
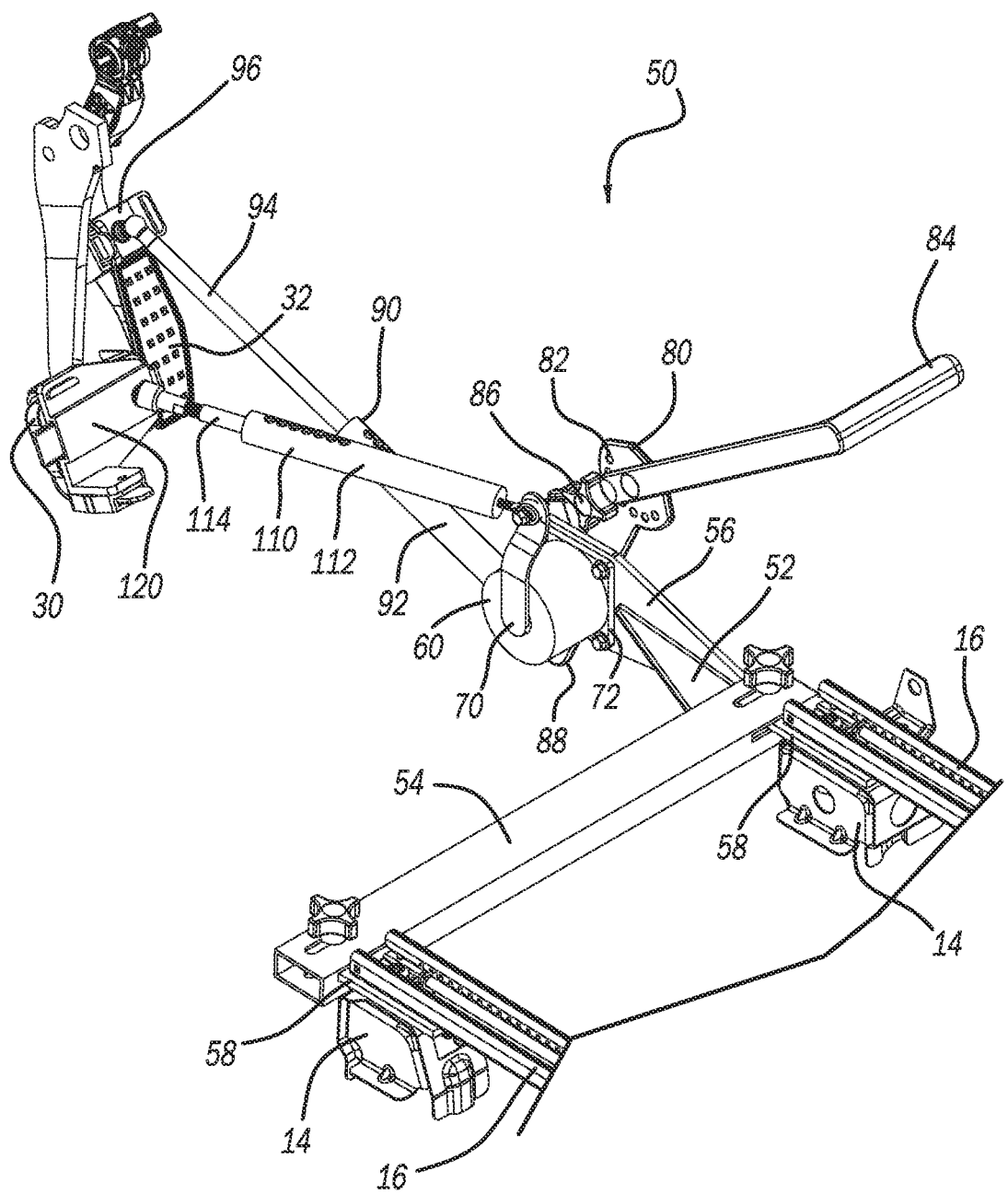
FIG. 2 is a perspective view of the system of FIG. 1 in an acceleration configuration.

With continued reference to FIG. 1, and additional reference to FIG. 2, the vehicle 10 generally includes a frame 12, which has a floor bar 14. On top of the floor bar 14 are seat rails 16. A driver seat 20 is mounted to the seat rails 16. The vehicle 10 further includes a brake pedal 30 and an accelerator pedal 32. Actuation of the brake pedal 30 engages brakes of the vehicle 10. Actuation of the accelerator pedal 32 accelerates the vehicle 10.

Figure 3:
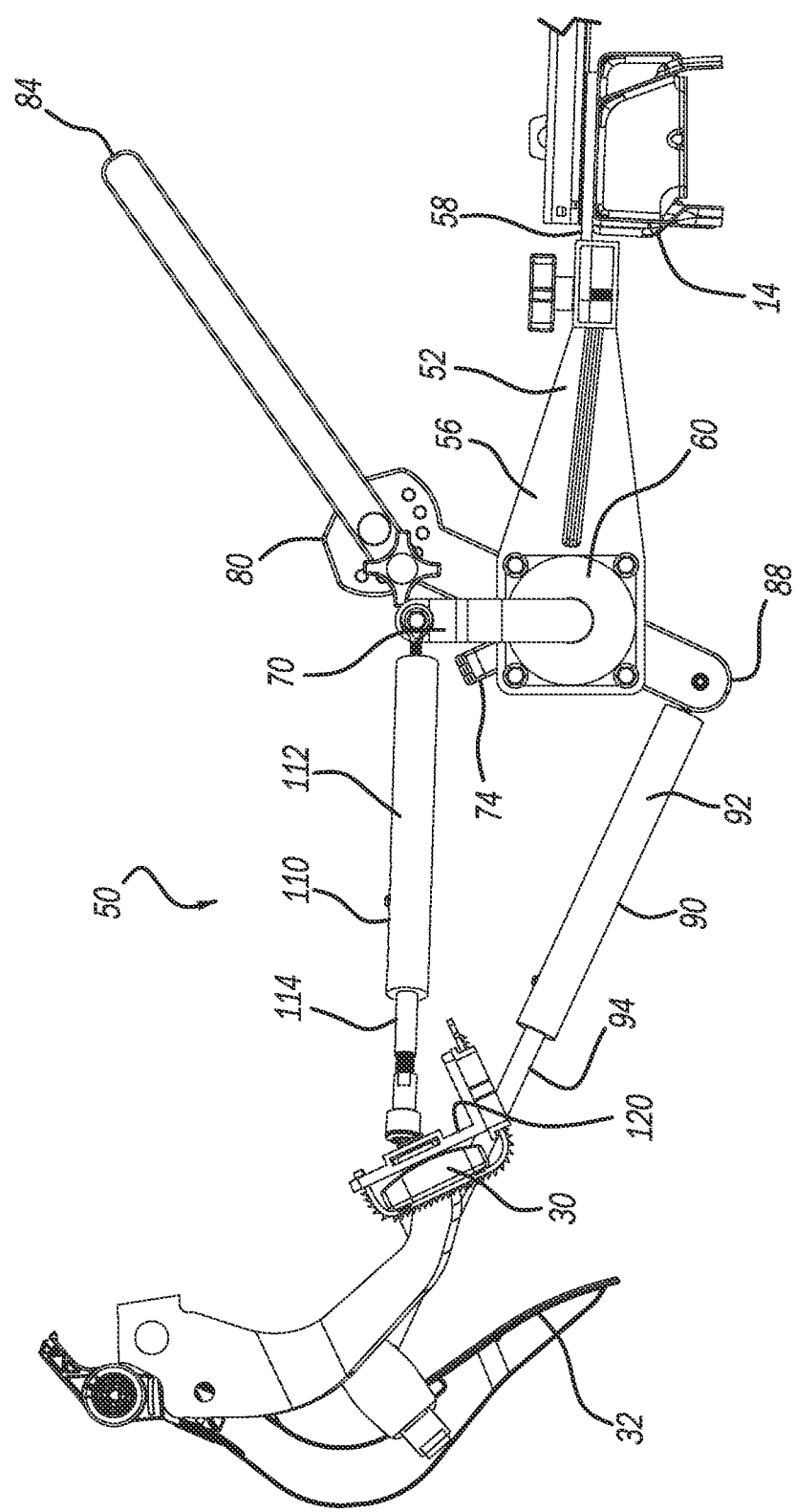
FIG. 3 is a side view of the system of FIG. 1 in the acceleration configuration.
Figure 4:
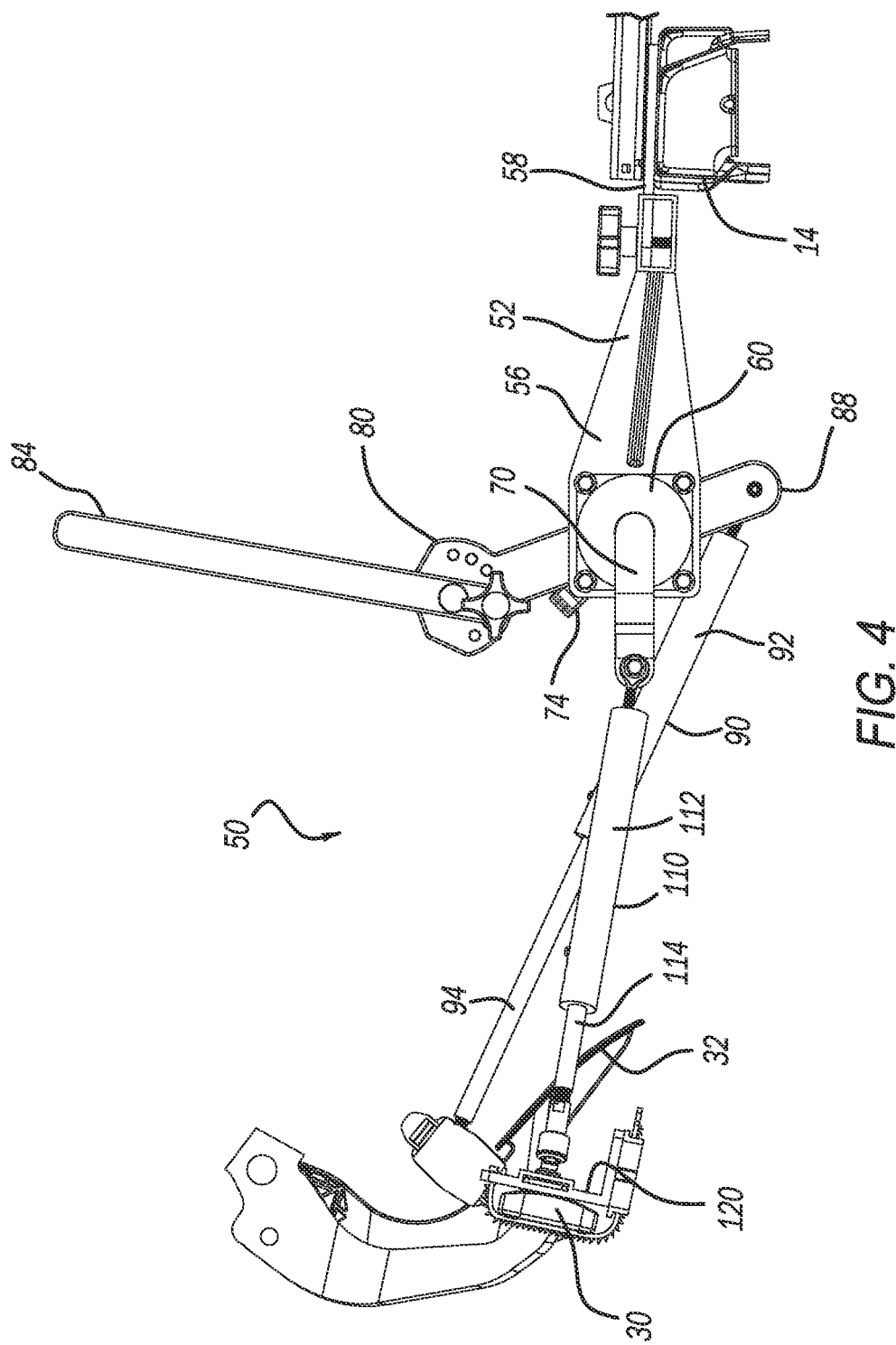
FIG. 4 is a side view of the system of FIG. 1 in a braking configuration.

With particular reference to FIGS. 2-4, the system 50 further includes a base 52. The base 52 includes a first portion 54 and a second portion 56. The first portion 54 is generally a bracket connected to adapter plates 58. The adapter plates 58 are each mounted between one of the seat rails 16 and the floor bar 14 with any suitable fasteners. The first portion 54 of the base 52 is removably mounted to the adapter plates 58 in any suitable manner to allow the base 52 to be disconnected from the adapter plates 58, and reconnected to similar adapter plates in another vehicle. Thus, the system 50 may be readily detached from the vehicle 10 and installed in another vehicle.

Figures 5, 6:
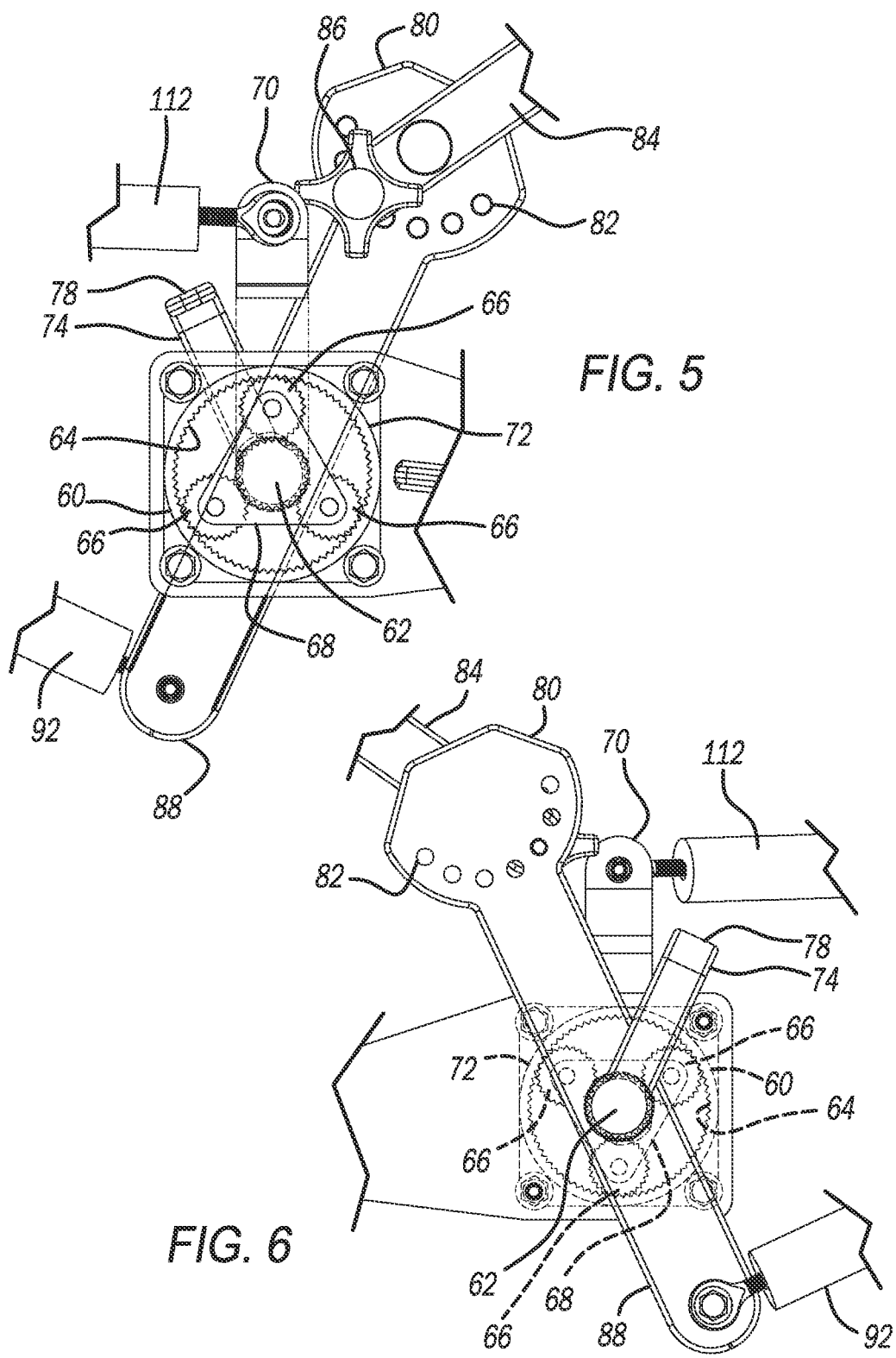
FIG. 5 is a side view of an actuation assembly of the system of FIG. 1.
FIG. 6 is an opposite side view of the actuation assembly of FIG. 5.

The second portion 56 of the base 52 extends from the first portion 54 at about 90° relative to a length of the first portion 54. Mounted to the second portion 56 is a planetary gear train 60. With particular reference to FIGS. 5 and 6, the planetary gear train 60 includes a center sun gear 62 and an outer ring gear 64. Between the sun gear 62 and the ring gear 64 are a plurality of planetary gears 66. The planetary gears 66 each mesh with the sun gear 62 and the ring gear 64. The ring gear 64 is incorporated into a housing 72, which is fastened to the second portion 56 of the base 52 using any suitable fasteners. Each one of the planetary gears 66 is mounted to a carrier 68. Extending from the carrier 68 is a carrier flange 70.

Extending from the sun gear 62 is a sun gear flange 74. The sun gear flange 74 is on a side of the second portion 56 of the base 52 that is opposite to the housing 72. A base 76 of the sun gear flange 74 is coaxial with the sun gear 62. The flange 74 extends from the base 76 perpendicular to an axis of rotation of the sun gear 62. At a distal end of the flange 74 is a tab 78. Rotation of the sun gear flange 74 rotates the sun gear 62.

Seated on the base 76 of the sun gear flange 74 is a lever 80, which rotates independently of the sun gear 62. The lever 80, the sun gear flange 74, and the sun gear 62 all rotate about a common axis of rotation. The lever 80 defines a plurality of apertures 82. Mounted to the lever 80 proximate to the apertures 82 is a handle 84. The handle 84 is positioned to be grasped and actuated by a driver of the vehicle 10. The handle 84 is rotatable relative to the lever 80, and may be locked at any suitable angle by a fastener 86, which is configured to cooperate with both the handle 84 and any one of the apertures 82 to lock the handle 84 at a suitable angle for the driver.

With renewed reference to FIGS. 1-4, the system 50 further includes an accelerator actuation assembly 90. The accelerator actuation assembly 90 includes a first portion 92, and a second portion 94. The second portion 94 is configured as a rod movable into and out of the first portion 92 in order to change the length of the accelerator actuation assembly 90. The first portion 92 is coupled to a distal end 88 of the lever 80, and the second portion 94 is connected to the accelerator pedal 32, as described further herein and illustrated in FIG. 7.

The system 50 further includes a brake actuation assembly 110. The brake actuation assembly 110 includes a first portion 112 and a second portion 114, which is movable into and out of the first portion 112 in order to set the length of the brake actuation assembly 110. The first portion 112 is connected to the carrier flange 70, and the second portion 114 is connected to the brake pedal 30, as described in detail herein.

Figure 7:
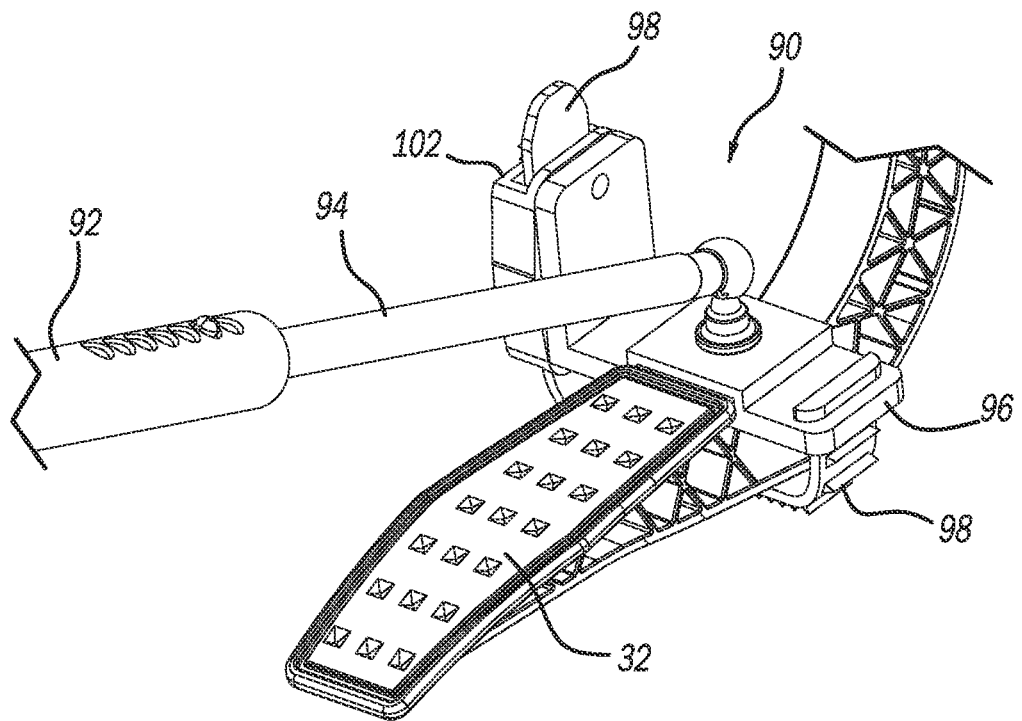
FIG. 7 is a perspective view of an accelerator coupling assembly of the system of FIG. 1.

With particular reference to FIG. 7, the accelerator actuation assembly 90 includes an accelerator plate 96, to which the second portion 94 is connected. Extending from the accelerator plate 96 is a strap 98. The strap 98 is configured to be wrapped around the accelerator pedal and secured within a receptacle 102 to couple the accelerator actuation assembly 90 to the accelerator pedal 32.

Figure 8:
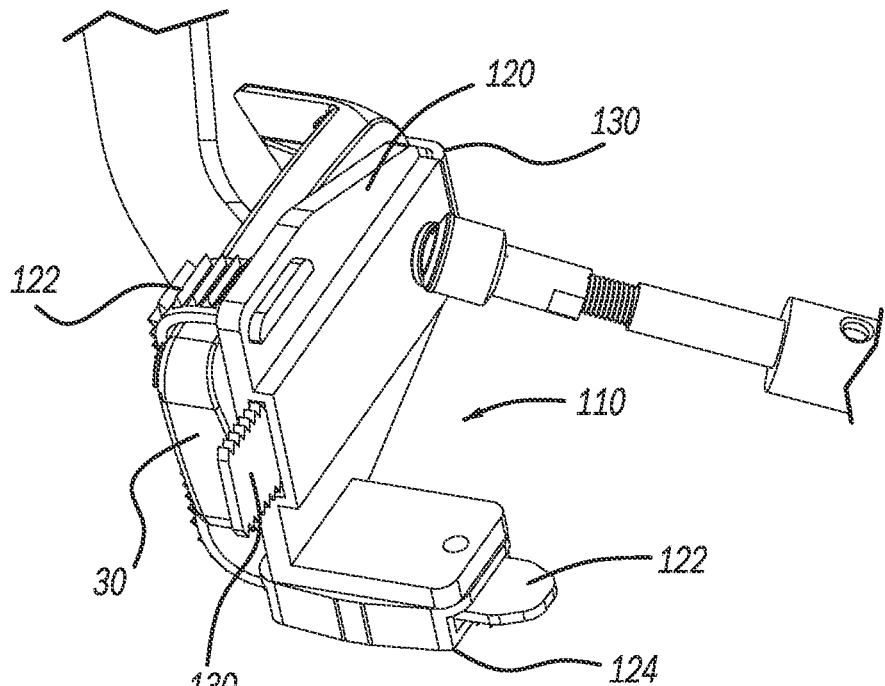
FIG. 8 is a perspective view of a brake coupling assembly of the system of FIG. 1.

With reference to FIG. 8, the brake actuation assembly 110 includes a brake plate 120, which is connected to the second portion 114. A strap 122 extends from the brake plate 120, and is configured to be secured within a receptacle 124, which is connected to the brake plate 120. To secure the brake plate 120 to the brake pedal 30, the strap 122 is wrapped around the brake pedal 30 and secured within the receptacle 124. The brake plate 120 further includes a flange 130, which is movable to abut a side of the brake pedal 30 to restrict lateral movement of the brake plate 120 relative to the brake pedal 30.

Use of the system 50 to depress the accelerator pedal 32 and accelerate the vehicle 10 will now be described. As illustrated in FIGS. 2 and 3, for example, to depress the accelerator pedal 32, the handle 84 is pulled by the driver backwards towards the seat 20. Pulling the handle 84 towards the seat 20 rotates the lever 80 about the sun gear flange 74 in a clockwise direction in the views of FIGS. 2 and 3. Rotation of the lever 80 in the clockwise direction moves the distal end 88 of the lever 80 towards the accelerator pedal 32, which pushes the accelerator actuation assembly 90 against the accelerator pedal 32 to depress the accelerator pedal 32. The further the handle 84 is pulled towards the seat 20, the deeper that the accelerator pedal 32 is depressed.

Pushing the handle 84 away from the seat 20 rotates the lever 80 in a counterclockwise direction as illustrated in FIG. 4, for example. This counterclockwise rotation of the lever 80 moves the distal end 88 away from the accelerator pedal 32, and pulls the accelerator actuation assembly 90 to raise the accelerator pedal 32, which decreases acceleration of the vehicle 10.

To depress the brake pedal 30, the handle 84 is pushed forward further so that the lever 80 contacts the sun gear flange 74, and specifically the tab 78 thereof, as illustrated in FIG. 4 for example. As the lever 80 is rotated further in the counterclockwise direction relative to the viewpoint illustrated in FIG. 4, the lever 80 rotates the sun gear flange 74 in the counterclockwise direction. Rotation of the sun gear flange 74 rotates the sun gear 62, which rotates the carrier flange 70 to push the brake actuator assembly 110 against the brake pedal 30 to depress the brake pedal 30 and actuate the brakes of the vehicle 10. To disengage the brakes of the vehicle 10, the handle 84 is pulled back towards the seat 20 and away from the sun gear flange 74 so that the sun gear flange 74 is no longer restricted from rotating clockwise by the lever 80. As a result, the brake pedal 30 is free to rise, which pushes the brake actuator assembly 110 back towards the seat 20, rotates the carrier flange 70 and the sun gear 62 clockwise, and moves the sun gear flange 74 clockwise back towards the lever 80.

The system 50 may be readily detached from the vehicle 10 and installed in any other suitable vehicle. For example, to detach the system 50 from the vehicle 10 the base 52 is decoupled from the adapter plates 58, the accelerator plate 96 is decoupled from the accelerator pedal 32 by detaching the strap 98, and the brake plate 120 is decoupled from the brake pedal 30 by detaching the strap 122. To install the system 50 in another vehicle, the base 52 is connected to adapter plates of the additional vehicle, which may be mounted beneath seat rails of the additional vehicle. The length of the accelerator actuation assembly 90 is set by moving the second portion 94 relative to the first portion 92, and locking the second portion 94 relative to the first portion 92. Similarly, the length of the brake actuation assembly 110 is set by moving the second portion 114 relative to the first portion 112, and then locking the second portion 114 relative to the first portion 112. The accelerator plate 96 is fastened to the accelerator pedal 32 by wrapping the strap 98 around the accelerator pedal 32, and feeding the strap 98 into the receptacle 102 to lock the strap 98 therein. The brake plate 120 is secured to the brake pedal of the additional vehicle by wrapping the strap 122 around the brake pedal and securing the strap 122 into the receptacle 124. The flange 130 is also maneuvered to abut a side of the brake pedal of the additional vehicle to restrict lateral movement of the brake plate 120 relative to the brake pad.

The carrier flange 70 rotates at a ratio relative to rotation of the sun gear flange 74 based on the size of the sun gear 62 and the planetary gears 66. To achieve different actuation ratios between the sun gear flange 74 and the carrier flange 70, the sun gear 62 and planetary gears 66 may be configured with any suitable size. Because the sun gear 62 and the planetary gears 66 are interchangeable with gears of other sizes, a wide variety of different gear ratios is possible. This allows for customization of the range of hand motion of the handle 84 necessary to control the brake pedal 30. This also helps the driver maintain their desired feel for the brake pedal 30 regardless of which vehicle the system 50 is installed in.

The carrier flange 70 has a length that matches, or nearly matches, full potential travel of the brake pedal 30 so that the brake pedal 30 may be fully depressed if called for. Thus, the length of the carrier flange 70 may be customized based on the particular vehicle 10 that the system 50 is installed in. To accommodate vehicles with different full potential travel distances, the carrier flange 70 may be replaced with a carrier flange having a length most suitable for the vehicle 10.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A system for actuating a brake pedal and an accelerator pedal of a vehicle by hand, the system comprising:
    a planetary gear train including a sun gear, a ring gear, and planetary gears meshed with both the sun gear and the ring gear, the planetary gears are mounted to a carrier;
    a carrier flange in cooperation with the carrier to rotate with the carrier;
    a sun gear flange in cooperation with the sun gear, rotation of the sun gear flange rotates the sun gear;
    a lever mounted adjacent to the sun gear flange;
    an accelerator actuation assembly connected to the lever and configured to couple with the accelerator pedal; and
    a brake actuation assembly connected to the carrier flange and configured to couple with the brake pedal;
    wherein:
        actuation of the lever in an acceleration direction pushes the accelerator actuation assembly against the accelerator pedal to depress the accelerator pedal; and
        actuation of the lever in a brake direction moves the lever into contact with the sun gear flange to rotate the sun gear flange and the sun gear, which rotates the carrier flange towards the brake pedal to push the brake actuation assembly against the brake pedal and depress the brake pedal.

2. The system of claim 1, wherein the lever is seated on a base of the sun gear flange and rotates independently of the sun gear flange.

3. The system of claim 1, further comprising a handle connected to the lever, the handle is configured to be grasped by a driver.

4. The system of claim 3, wherein the handle is pivotably movable relative to the lever to change a handle angle of the handle relative to the lever.

5. The system of claim 1, wherein the accelerator actuation assembly is connected directly to the lever.

6. The system of claim 5, wherein the accelerator actuation assembly is connected to a distal end of the lever that is opposite to a proximal end of the lever to which a handle is connected to.

7. The system of claim 1, further comprising a base including a first side to which the planetary gear train is mounted and a second side on which the sun gear flange and the lever are arranged.

8. The system of claim 7, wherein the base is connected to an adaptor plate configured to be mounted to the vehicle beneath a seat rail.

9. The system of claim 1, wherein the accelerator actuation assembly includes an accelerator plate at a distal end of the accelerator actuation assembly, the accelerator plate includes a strap and a receptacle, the strap is configured to be wrapped around the accelerator pedal and locked in the receptacle to couple the accelerator actuation assembly to the accelerator pedal.

10. The system of claim 1, wherein the brake actuation assembly includes:
    a brake plate at a distal end of the brake actuation assembly;
    a strap and a receptacle mounted to the brake plate, the strap is configured to be wrapped around the brake pedal and locked in the receptacle to couple the brake plate to the brake pedal; and
    a flange mounted to the brake plate, the flange is adjustable to abut an outer edge of the brake pedal to restrict lateral movement of the brake plate relative to the brake pedal.

11. A system for actuating a brake pedal and an accelerator pedal of a vehicle by hand, the system comprising:
    a base including a bracket configured to be mounted to a seat rail of the vehicle;
    a planetary gear train mounted to a first side of the base, the planetary gear train including a sun gear, a ring gear, and planetary gears meshed with both the sun gear and the ring gear, the planetary gears are mounted to a carrier;

a carrier flange in cooperation with the carrier such that rotation of the carrier rotates the carrier flange;

a sun gear flange on a second side of the base that is opposite to the first side, the sun gear flange in cooperation with the sun gear such that rotation of the sun gear flange rotates the sun gear;

a lever mounted on a base of the sun gear flange and rotatable independent of the sun gear flange;

an accelerator actuation assembly connected directly to the lever and configured to couple with the accelerator pedal; and a brake actuation assembly connected to the carrier flange and configured to couple with the brake pedal;

wherein:
    actuation of the lever in an acceleration direction pushes the accelerator actuation assembly against the accelerator pedal to depress the accelerator pedal; and
    actuation of the lever in a brake direction moves the lever into contact with the sun gear flange to rotate the sun gear flange and the sun gear, which rotates the carrier flange towards the brake pedal to push the brake actuation assembly against the brake pedal and depress the brake pedal.

12. The system of claim 11, wherein each one of the carrier flange, the sun gear flange, the sun gear, and the lever rotate about a common axis of rotation.

13. The system of claim 11, wherein the bracket is configured to be mounted to a seat rail of the vehicle by way of an adaptor plate.

14. The system of claim 11, wherein the accelerator actuation assembly includes an accelerator plate at a distal end of the accelerator actuation assembly, the accelerator plate includes a strap and a receptacle, the strap is configured to be wrapped around the accelerator pedal and locked in the receptacle to couple the accelerator actuation assembly to the accelerator pedal.

15. The system of claim 11, wherein the brake actuation assembly includes:
    a brake plate at a distal end of the brake actuation assembly;
    a strap and a receptacle mounted to the brake plate, the strap is configured to be wrapped around the brake pedal and locked in the receptacle to couple the brake actuation assembly to the brake pedal; and
    a flange mounted to the brake plate, the flange is adjustable to abut an outer edge of the brake pedal to restrict lateral movement of the brake plate relative to the brake pedal.

16. The system of claim 11, further comprising a handle connected to the lever, the handle is configured to be grasped by a driver.

17. The system of claim 16, wherein the handle is pivotably movable relative to the lever to change a handle angle of the handle relative to the lever.

18. A system for actuating a brake pedal and an accelerator pedal of a vehicle by hand, the system comprising:

a planetary gear train including a sun gear, a ring gear, and planetary gears meshed with both the sun gear and the ring gear, the planetary gears are mounted to a carrier;

a carrier flange in cooperation with the carrier to rotate with the carrier;

a sun gear flange in cooperation with the sun gear, rotation of the sun gear flange rotates the sun gear;

a lever mounted on a base of the sun gear flange, the lever rotatable independent of the sun gear;

an accelerator actuation assembly coupled to the lever and including an accelerator plate, a strap, and a coupling member configured to couple with the strap, the strap is configured to be wrapped around the accelerator pedal and locked to the coupling member to secure the accelerator actuation assembly to the accelerator pedal; and a brake actuation assembly connected to the carrier flange and including a brake plate and a brake strap, the brake strap is configured to be wrapped around the brake pedal to couple the brake actuation assembly to the brake pedal;

wherein:
    each one of the carrier flange, the sun gear flange, the sun gear, and the lever rotate about a common axis;
    rotation of the lever in an acceleration direction pushes the accelerator actuation assembly against the accelerator pedal to depress the accelerator pedal; and
    rotation of the lever in a brake direction, which is opposite to the acceleration direction, moves the lever into contact with the sun gear flange to rotate the sun gear flange and rotate the carrier flange towards the brake pedal to push the brake actuation assembly against the brake pedal and depress the brake pedal.

19. The system of claim 18, wherein the brake actuation assembly further includes a flange mounted to the brake plate, the flange is adjustable to abut an outer edge of the brake pedal to restrict lateral movement of the brake plate relative to the brake pedal.

20. The system of claim 18, further comprising a base including a first side to which the planetary gear train is mounted and a second side on which the sun gear flange and the lever are arranged.

\* \* \* \* \*